United States Patent Office 2,951,826
Patented Sept. 6, 1960

2,951,826

FLAME-RESISTANT SPIROBI(META-DIOXANE) COMPOSITIONS

Howard R. Guest, Charleston, and Ben W. Kiff, Ona, W. Va., assignors to Union Carbide Corporation, a corporation of New York No Drawing. Filed Aug. 29, 1958, Ser. No. 757,897

14 Claims. (Cl. 260—88.3)

This invention relates to a new class of compounds derived from 3,9-dialkenylspirobi(meta-dioxane) derivatives. In a particular aspect, this invention relates to resins containing spirobi(meta-dioxane) groups and chemically-bound phosphorus.

Resins formed by the polymerization of unsaturated spirobi(meta-dioxane) derivatives with polyols have many properties which make them commercially attractive. They are hard and tough and can be made with good clarity and color. However, in common with most other organic plastic materials commercially available, they suffer the disadvantage of being flammable. In many applications, particularly in the structural field, there would be great advantage in having strong, tough, rigid plastics with excellent weatherability characteristics which at the same time were flame-resistant.

A conventional method of reducing the flammability of a plastic is to incorporate mechanically a phosphorus-containing plasticizer into the plastic by milling or other similar operation. Considerable quantities of such plasticizers are required to produce this flame-resistance property in the plastic. Usually the plasticizer modifies other properties of the plastic in a beneficial way at the same time. Plasticizers of this type include compounds such as tricresyl phosphate and trioctyl phosphate.

This method of reducing the flammability of plastics with phosphorus-containing plasticizers is not practical for polymers produced from spirobi(meta-dioxane) derivatives. These polymers are not compatible with many of the phosphorus-containing plasticizers, and when proper compatibility between the polymers and plasticizers is accomplished it is found that many of the desirable properties of the polymers are adversely affected. Further, no additive is known which can be mixed mechanically with spirobi(meta-dioxane) polymers to produce non-flammable compositions.

It is a main object of this invention to produce flame-resistant spirobi(meta-dioxane) polymers. Other objects and advantages of this invention will become apparent to those skilled in the art from the accompanying description and disclosure.

Accordingly, flame-resistant polymers are produced by reacting together a mixture of a 3,9-dialkenylspirobi-(meta-dioxane) derivative and a partial phosphite ester derivative of pentaerythritol. The polymers so produced contain chemically-bound phosphorus as a substantive part of the polymers. In a preferred embodiment of this invention, an aliphatic polyhydric alcohol is included as a third component of the reaction system.

The 3,9 - dialkenylspirobi(meta - dioxane) derivatives contemplated are those having an alkenyl substituent in the three-position and in the nine position which contains between two and about eighteen carbon atoms. The respective alkenyl groups can be identical or different species. A particularly useful group of these unsaturated spirobi acetal compounds are those derived from the reaction of acrolein and substituted acroleins with pentaerythritol. Such unsaturated spirobi acetals may be represented by the formula:

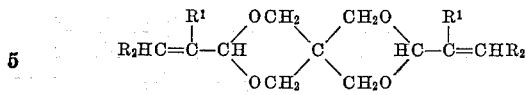

wherein $R_1$ is hydrogen, methyl or chlorine, and $R_2$ is hydrogen or methyl.

Unsaturated spirobi acetals which correspond to the formula include:

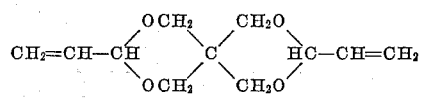

3,9-divinylspirobi(meta-dioxane)

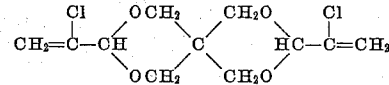

3,9-di(1-chlorovinyl)spirobi(meta-dioxane)

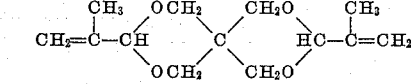

3,9-diisopropenylspirobi(meta-dioxane)

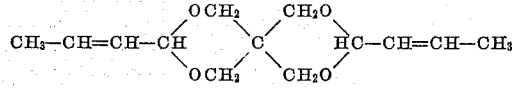

3,9-dipropenylspirobi(meta-dioxane)

Unsaturated spirobi(meta-dioxane) derivatives are readily prepared by the condensation of a mole of pentaerythritol with two moles of an unsaturated aldehyde or ketone, or mixtures thereof, in the presence of an acid catalyst such as p-toluenesulfonic acid. The following reaction schemes are illustrative of the general synthetic method. When acrolein is employed, an unsubstituted 3,9-divinylspirobi(meta-dioxane) is obtained:

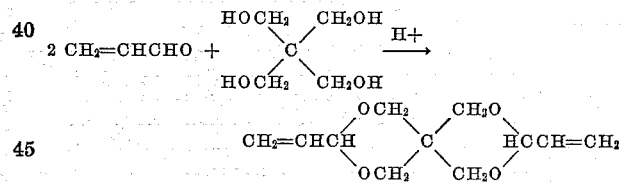

When the condensation is conducted with an unsaturated ketone, then the three- and nine-positions of the spirobi(meta-dioxane) nucleus obtained have two substituents rather than one:

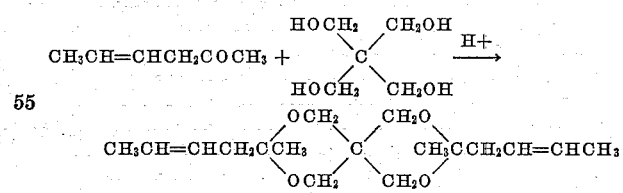

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-(olefinically-substituted)spirobi(meta-dioxane) compounds which may be resolved into pure components or which may be used as crude mixtures directly in polymerization reactions.

The partial phosphite ester derivatives of pentaerythritol contemplated for chemically incorporating phosphorus into the polymers to make them flame-resistant can be prepared by a transesterification reaction between pentaerythritol and a molar equivalent or less of a trialkyl phosphite. A major portion of the transesterification reaction appears to proceed in the following manner:

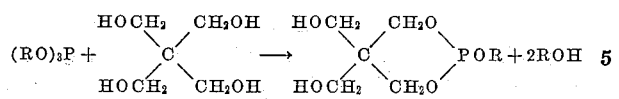

The transesterification reaction is preferably conducted between pentaerythritol and a phosphite ester which is the derivative of an alcohol that can be removed continuously from the transesterification reaction medium as the reaction proceeds. The ester is in equilibrium with both pentaerythritol and the exchanged alcohol so that the removal of the exchanged alcohol moiety is necessary to produce a favorable shift of the reaction equilibrium in the direction of pentaerythritol partial phosphite ester formation. For example, triethyl phosphite and triisopropyl phosphite are especially suitable for this transesterification method of producing pentaerythritol phosphite esters because both ethanol and isopropanol can be continuously distilled off under atmospheric pressure without any difficulty and a high yield of desired product is obtained. The pentaerythritol partial phosphite esters, or mixtures thereof, preferred, are those which have an average of at least two free hydroxy groups per ester molecule available for reaction with 3,9-dialkenylspirobi-(meta-dioxane) derivatives to produce flame-resistant resins.

The aliphatic polyhydric alcohols contemplated to be employed as a reactive comonomer in the formation of the flame-resistant polymers are those members of this class of compounds which are properly reactive and convenient to use which include aliphatic diols such as ethylene glycol, propylene glycol, butylene glycol, 1,4-butanediol, 1,6-hexanediol, 2-ethylhexane-1,3-diol, and the like; polyalkylene glycol derivatives such as diethylene glycol, triethylene glycol, pentaethylene glycol, dipropylene glycol, tripropylene glycol, and the like; aliphatic triols such as glycerol, 1,2,4-butanetriol, trimethylol ethane, trimethylolpropane, and the like; and higher polyols such as pentaerythritol, sorbitol, mannitol, dulcitol, 2,4-dihydroxy-1,3-di(hydroxymethyl)pentane, and the like. The ready availability, low cost and high ratio of hydroxyl groups to molecular weight make pentaerythritol one of the most useful of the aliphatic polyhydric alcohols available. In addition, since it is employed to synthesize the 3,9-dialkenylspirobi(meta-dioxane) derivatives it is of course advantageous to continue its use throughout the entire preparation. Furthermore, its unique structure allows it to cross-link the unsaturated spirobi(meta-dioxane) derivatives in a way that confers the properties associated with a highly symmetrical molecule upon the polymer.

The reaction for producing flame-resistant spirobi-(meta-dioxane) polymers can be conducted by the simple expediency of heating a mixture of a 3,9-dialkenylspirobi-(meta-dioxane), an aliphatic polyhydric alcohol when it is being employed, and partial phosphite ester of pentaerythritol at a temperature between about 60° C. and 150° C. The polymerization may require a reaction period of twenty-four hours or longer at the lower reaction temperatures, and a reaction period as short as five minutes may be satisfactory to complete the curing of the polymer product at the higher temperatures.

The relative concentrations of the reactants can be varied over a wide range to produce the flame-resistant resins. For example, pentaerythritol has four hydroxyl groups (tetrafunctional) and 3,9-dialkenylspirobi(meta-dioxane) has two double bonds (difunctional) so that the theoretical combining ratio is two moles of 3,9-dialkenylspirobi(meta-dioxane) for every mole of pentaerythritol. However, resins with desirable properties can be produced over the concentration range of between one mole and three moles of 3,9-dialkenylspirobi(meta-dioxane) for every mole of pentaerythritol. Generally, it is practical to use not less than two moles of 3,9-dialkenylspirobi-(meta-dioxane) for each mole of pentaerythritol reacted. Preferably, a quantity of 3,9-dialkenylspirobi(meta-dioxane) is employed which is equivalent in functionality to the total amount of polyhydric alcohol and partial ester of pentaerythritol with which it is copolymerized. As mentioned above, the preferred pentaerythritol partial phosphite esters have two available hydroxyl groups which react with olefinic groups during the polymerization reaction.

The quantity of partial phosphite ester employed is not narrowly critical. In cases where a large portion or all of the aliphatic polyhydric alcohol is replaced with partial phosphite esters, the amount of phosphite ester in the resin product can vary up to as high as 50 or 60 percent of the resin weight. The preferred weight range of partial phosphite ester employed is between about 10 percent and 30 percent of the weight of reactants, i.e., the total weight of 3,9-dialkenylspirobi(meta-dioxane), aliphatic polyhydric alcohol and partial phosphite ester reactants. Quantities less than about 10 percent by weight can be incorporated into the compositions but it has been found in many cases that the resins containing these lesser quantities of partial phosphite ester support combustion and are not self-exinguishing. Similarly, quantities of partial phosphite ester in excess of about 30 percent by weight of the total weight of reactants polymerized can be employed if desired. However, such larger quantities of partial phosphite ester do not appreciably increase the flame-resistance of the resins and they may deleteriously affect other characteristics of the resins.

It is desirable to conduct the polymerization reaction in the presence of an acidic curing catalyst to promote a reasonable reaction rate. Satisfactory curing catalysts include acidic catalysts such as sulfuric acid, toluenesulfonic acid, benzenesulfonic acid, boron trifluoride, aluminum chloride, dialkyl sulfates such as diethyl sulfate, dimethyl sulfate, diisopropyl sulfate, and the like, titanium tetrachloride, phenyl acid phosphate, octylphenyl acid phosphate, and the like. Curing catalyst concentrations can vary from as little as 0.1 percent by weight for the more active catalysts, up to 1.0 percent by weight or more for the less active catalysts, based on the total weight of the reaction mixture.

In another method found convenient for preparing flame-resistant polymers, an unsaturated aldehyde or ketone, such as acrolein, is reacted with pentaerythritol in stoichiometric quantities calculated from the reciprocal of their functionalities (e.g., three moles of pentaerythritol to four moles of acrolein) to produce a liquid pre-condensate in the presence of an acid catalyst. The pre-condensate polymerization reaction is conducted at a temperature between about 60° C. and 100° C. for a period of time between one-half hour and five hours depending on the viscosity desired for the pre-condensate A-stage resin. After the water of reaction is removed, the A-stage resin is usually a viscous liquid which slowly condenses to a solid plastic on standing. For practical purposes, the condensation can be stopped by neutralization or removal of the catalyst. The neutral liquid A-stage resin can be stored until needed.

Flame-resistant polymers are prepared from the liquid A-stage resin condensate by mixing a calculated quantity of partial phosphite ester of pentaerythritol into the said liquid resin and heating the mixture until complete curing is obtained. A curing catalyst is also added to the mixture, unless the catalyst employed for preparing the liquid A-stage resin is still present in the mixture in a sufficient quantity to promote formation of a cured, flame-resistant resinous product. This final cure can be accomplished at the same temperature used for the formation of the intermediate liquid A-stage resin, or higher temperatures may be employed such as between 100° C. and 150° C.

The flame-resistant spirobi(meta-dioxane) polymers of this invention can be employed to produce molded articles, laminates, or any product for which other thermosetting resins are used. The polymers of this invention have the advantage of being self-extinguishing when ignited, besides being strong, tough and rigid.

These flame-resistant polymers also have the advantage over many other thermoset resins in that they cured without the formation of volatile by-products, such as water, and there is little or no shrinkage during the curing process.

The following examples will serve to illustrate particular embodiments of this invention.

*Example 1*

A charge of 408 grams of pentaerythritol (3.0 moles) and 336 grams of triethyl phosphite (2.0 moles) was introduced into a reaction flask fitted with a distillation column. The mixture was heated to a temperature of 130° C., at which temperature ethanol began to distill from the reaction medium. After two hours of heating, the reaction temperature rose to 160° C. at which time distillate was no longer evident. The total distillate weighed 232 grams and consisted largely of ethanol with some unreacted triethyl phosphite. The contents of the flask were heated at a temperature of 160° C. for an additional four hours and then stripped free of all materials volatile at a temperature of 150° C. under a pressure of 2 millimeters of mercury. The residual product recovered weighed 451 grams and was a viscous, colorless liquid. By elemental analysis it was determined that the product contained 37.64 percent carbon, 7.20 percent hydrogen and 7.8 percent phosphorus. The observed molecular weight was 210, and the equivalent weight was 106 as determined by hydroxyl analysis.

The physical constants of the product indicated that a substantial portion of the material was a partial phosphite ester having two free hydroxyl groups per molecule:

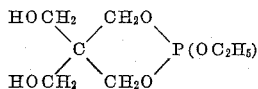

This liquid product was used to prepare the flame-resistant polymers described in the following examples.

*Example 2*

A charge of 1865 grams of pentaerythritol, 1287 grams of acrolein (97.2 percent) and 12.7 grams of 37 percent hydrochloric acid was introduced into a reaction flask and heated for a period of ninety minutes at a temperature of 70° C. After this reaction period, material was distilled from the reaction flask which was volatile at a temperature of 70° C. under a pressure of 5 millimeters of mercury. A residual A-stage resin was recovered from the reaction flask.

To a portion of the A-stage liquid there was added 0.3 percent mixed alkanesulfonic acid and the mixture was cured for a period of sixteen hours at a temperature of 100° C. A bar of dimensions 5" x ½" x ⅛" was tested for flammability according to ASTM-D635-44. The bar burned briskly and was totally consumed in less than one minute.

To an 80 gram portion of the A-stage liquid there was added 20 grams of the phosphite product described in Example 1 and 0.3 gram mixed alkanesulfonic acid. The material was cured at a temperature of 100° C. for a period of sixteen hours and the resulting polymer had these properties:

Heat distortion, ° C _____ 65
Impact (Izod) ft. lbs./in. of notch _____ 0.9
Hardness-Durometer "D" _____ 85

A thin bar was tested for flammability according to ASTM-D635-44. It was found that the bar was self-extinguishing after being repeatedly ignited with a torch.

*Example 3*

A mixture was prepared from 90 grams of the A-stage material described in Example 2 and 10 grams of the pentaerythritol partial phosphite ester described in Example 1. After the addition of 0.3 percent mixed alkanesulfonic acid, the material was cured at a temperature of 150° C. to produce a polymer with excellent color and good properties. A thin bar was tested for flammability in the manner prescribed in ASTM-D635-44 and it was found to be self-extinguishing even though it was ignited repeatedly.

*Example 4*

A mixture of 160 grams of 3,9-divinylspirobi(meta-dioxane), 100 grams of pentaerythritol partial phosphite ester prepared in the same manner described in Example 1, and 1 gram of octylphenyl acid phosphate was heated for four hours at a temperature of 100° C. to 130° C. The reaction mixture was cooled to a temperature of 45° C. and 1.3 grams of mixed alkanesulfonic acid was added. After it was poured into molds, the material was cured for a period of sixteen hours at a temperature of 100° C. The resulting polymer had a very light color and was hard and tough. It was found to be self-extinguishing even though it was ignited repeatedly in the manner prescribed in ASTM-D635-44.

What is claimed is:

1. A curable composition comprising 3,9-dialkenyl-spirobi(meta-dioxane) having between two and eighteen carbon atoms in each alkenyl radical, and between about 10 percent and 60 percent by weight, based on total composition weight, of partial phosphite ester of pentaerythritol having at least two free hydroxyl groups.

2. A curable composition comprising 3,9-dialkenyl-spirobi(meta-dioxane) having between two and eighteen carbon atoms in each alkenyl radical, aliphatic polyhydric alcohol, and between about 10 percent and 60 percent by weight, based on total composition weight, of partial phosphite ester of pentaerythritol having at least two free hydroxyl groups.

3. A curable composition comprising 3,9-dipropenyl-spirobi(meta-dioxane), pentaerythritol, and between about 10 percent and 60 percent by weight, based on total composition weight, of partial phosphite ester of pentaerythritol having at least two free hydroxyl groups.

4. A curable composition comprising 3,9-diisopropenylspirobi(meta-dioxane), pentaerythritol, and between about 10 percent and 60 percent by weight, based on total composition weight, of partial phosphite ester of pentaerythritol having at least two free hydroxyl groups.

5. A curable composition comprising 3,9-di(1-chlorovinyl)spirobi(meta-dioxane), pentaerythritol, and between about 10 percent and 60 percent by weight, based on total composition weight, of partial phosphite ester of pentaerythritol having at least two free hydroxyl groups.

6. A curable composition comprising 3,9-divinylspirobi(meta-dioxane), pentaerythritol, and between about 10 percent and 60 percent by weight, based on total composition weight, of partial phosphite ester of pentaerythritol having at least two free hydroxyl groups.

7. A process for preparing resins which comprises heating at reaction temperature a mixture comprising 3,9-dialkenylspirobi(meta-dioxane) having between two and eighteen carbon atoms in each alkenyl radical, and between about 10 percent and 60 percent by weight, based on total composition weight, of partial phosphite ester of pentaerythritol having at least two free hydroxyl groups.

8. A process for preparing flame-resistant resins which comprises heating at reaction temperature 3,9-dialkenyl-spirobi(meta-dioxane) having between two and eighteen carbon atoms in each alkenyl radical, aliphatic polyhydric alcohol, and between about 10 percent and 60 percent by weight based on total composition weight, of partial phosphite ester of pentaerythritol having at least two free hydroxyl groups.

9. A process for preparing flame-resistant resins which comprises heating at reaction temperature 3,9-divinyl-spirobi(meta-dioxane), pentaerythritol, and between about 10 percent and 60 percent by weight based on total composition weight, of partial phosphite ester of pentaerythritol having at least two free hydroxyl groups in the presence of an acidic catalyst.

10. The process of claim 9 wherein the acidic catalyst is alkanesulfonic acid.

11. A process for preparing flame-resistant resins which comprises heating at reaction temperature a liquid resin condensate of acrolein and pentaerythritol with between about 10 percent and 60 percent by weight, based on total composition weight, of a partial phosphite ester of pentaerythritol having at least two free hydroxyl groups in the presence of an acidic catalyst to form a solid polymer.

12. A curable composition comprising between about 10 percent and 60 percent by weight, based on total composition weight, of a partial phosphite ester of pentaerythritol having at least two free hydroxyl groups, and a liquid resin condensate of acrolein and pentaerythritol.

13. The composition of claim 1 cured at a temperature between 60° C. and 150° C.

14. The composition of claim 2 cured at a temperature between 60° C. and 150° C.

No references cited.